United States Patent
Olsen et al.

(10) Patent No.: US 8,197,202 B2
(45) Date of Patent: Jun. 12, 2012

(54) PRECAST GROOVES FOR A STATOR BLADE ASSEMBLY

(75) Inventors: Steven Olsen, Wooster, OH (US); Jens Muehlhausen, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 459 days.

(21) Appl. No.: 12/472,942

(22) Filed: May 27, 2009

(65) Prior Publication Data

US 2009/0297343 A1  Dec. 3, 2009

Related U.S. Application Data

(60) Provisional application No. 61/130,751, filed on Jun. 3, 2008.

(51) Int. Cl.
*F01D 9/04* (2006.01)
(52) U.S. Cl. .................................. 415/209.3; 415/209.4
(58) Field of Classification Search .................. 415/136, 415/209.3, 209.4
See application file for complete search history.

(56) References Cited

U.S. PATENT DOCUMENTS

| | | | | |
|---|---|---|---|---|
| 4,827,800 A | * | 5/1989 | Pedersen et al. | 475/162 |
| 5,125,487 A | * | 6/1992 | Hodge | 192/3.34 |
| 5,822,987 A | * | 10/1998 | Tsukamoto et al. | 60/441 |
| 6,044,946 A | | 4/2000 | Makino et al. | |

* cited by examiner

*Primary Examiner* — Edward Look
*Assistant Examiner* — Liam McDowell
(74) *Attorney, Agent, or Firm* — Simpson & Simpson, PLLC

(57) ABSTRACT

A stator, including a blade assembly with an inner circumferential surface and a plurality of pre-formed grooves in the inner circumferential surface and an outer race with an outer circumferential surface and a plurality of protrusions at least partially engaged with the plurality of pre-formed grooves. The plurality of protrusions is frictionally engaged with the plurality of pre-formed grooves. In one embodiment, the inner circumferential surface includes an area circumferentially disposed between first and second protrusions from the plurality of protrusions and a portion of the area is displaced radially inward by the engagement of the pluralities of grooves and protrusions.

10 Claims, 4 Drawing Sheets

PRECAST GROOVES FOR A STATOR BLADE ASSEMBLY

CROSS-REFERENCE TO RELATED APPLICATIONS

This application claims the benefit under 35 U.S.C. §119(e) of U.S. Provisional Application No. 61/130,751, filed Jun. 3, 2008, which application is incorporated herein by reference in its entirety.

FIELD OF THE INVENTION

The invention relates to a stator for a torque converter having an increased torque capacity under high temperature operating conditions. In particular, the invention relates to a stator having primarily an interference fit between an outer race and a blade assembly.

BACKGROUND OF THE INVENTION

FIG. 1A is a detail from a prior art stator showing overlap of an outer race and a blade assembly prior to engagement of the outer race and the blade assembly.

FIG. 1B is a detail from the prior art stator showing the engagement of the outer race and the blade assembly. The following should be viewed in light of FIGS. 1A and 1B. For a torque converter stator, it is known to join an outer race, for example, race 10, with a portion of a blade assembly, for example, portion 12 which has a smooth circumference or round bore, by forming teeth 14 in the outer race and axially displacing the outer race into portion 12 so that the teeth cut into the portion 12. The preceding procedure results in the teeth cutting into portion 12. Unfortunately, to reduce hoop stresses in portion 12 due to the cutting process, the amount that the teeth cut into portion 12, and therefore the size of the teeth, must be kept to a minimum, which results in reduced torque capacity for the stator as described infra. The preceding procedure results in radially outward force, for example, in direction 16, caused by the cutting/displacing action of the teeth with respect to portion 12. Unfortunately, the force pushes portion 12 radially outward and contributes to hoop stresses in portion 12.

In general, portion 12 is formed of aluminum and teeth 14 are formed of steel. Aluminum has a much greater thermal expansion coefficient than steel and thus under high temperature operating conditions for the stator, portion 12 expands radially outward (in direction 16) faster than the outer race expands radially outward, and "pulls away from" the outer race. As portion 12 pulls away, the teeth are drawn out of portion 12, eventually leaving only tips 18 of the teeth in contact with surface 20 of portion 12 so that only tips 18 and surface 20 connect the blade assembly to the outer race. Prior to the expansion noted above, sides 22 of the blade portion are circumferentially pressing against sides 24 of the teeth to transfer the torque to the outer race and thus, the torque capacity of the stator is relative to the capability of the intermeshed segments 26 and 28 of the outer race and portion 12, respectively, to withstand a circumferential shearing force. Unfortunately, the torque capacity is greatly reduced in the case when only tips 18 and surface 20 connect the blade assembly to the outer race.

Thus, there is a long-felt need for a stator having a higher torque capacity, in particular, under high temperature operating conditions.

BRIEF SUMMARY OF THE INVENTION

The present invention broadly comprises a stator, including a blade assembly with an inner circumferential surface and a plurality of pre-formed grooves in the inner circumferential surface and an outer race with an outer circumferential surface and a plurality of protrusions at least partially engaged with the plurality of pre-formed grooves. The plurality of protrusions is frictionally engaged with the plurality of pre-formed grooves. In a first embodiment, the inner circumferential surface includes an area circumferentially disposed between first and second protrusions from the plurality of protrusions and a portion of the area is displaced radially inward by the engagement of the pluralities of grooves and protrusions. In a second embodiment, the inner circumferential surface includes an area circumferentially disposed between first and second protrusions from the plurality of protrusions and a portion of the area adjacent to the first protrusion is disposed further radially inward than a portion of the area circumferentially centered between the first and second protrusions. In a third embodiment, the inner circumferential surface includes an area circumferentially disposed between first and second protrusions from the plurality of protrusions and by the engagement of the pluralities of grooves and protrusions.

In a fourth embodiment, the blade assembly includes an inner circumferential portion and outer circumferential portion and a plurality of blades disposed between the inner and outer circumferential portions, the inner circumferential portion includes the inner circumferential surface, the inner circumferential portion is made of aluminum, and the outer race is made of steel. In a fifth embodiment, the blade assembly includes an inner circumferential portion and outer circumferential portion and a plurality of blades disposed between the inner and outer circumferential portions, the inner circumferential portion includes the inner circumferential surface, the inner circumferential portion is made of a first material having a first thermal expansion coefficient, and the outer race is made of a second material having a second thermal expansion coefficient less than the first thermal expansion coefficient. In a sixth embodiment, the stator includes an axis of rotation, the inner circumferential surface is at a first radial distance from the axis before the pluralities of grooves and protrusions are engaged, and the inner circumferential surface is at a second radial distance from the axis, substantially equal to the first radial distance, after the pluralities of grooves and protrusions are engaged.

The present invention also broadly comprises a method for joining an outer race and a blade assembly for a stator.

It is a general object of the present invention to provide a stator having a higher torque capacity, in particular, under high temperature operating conditions.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1A:
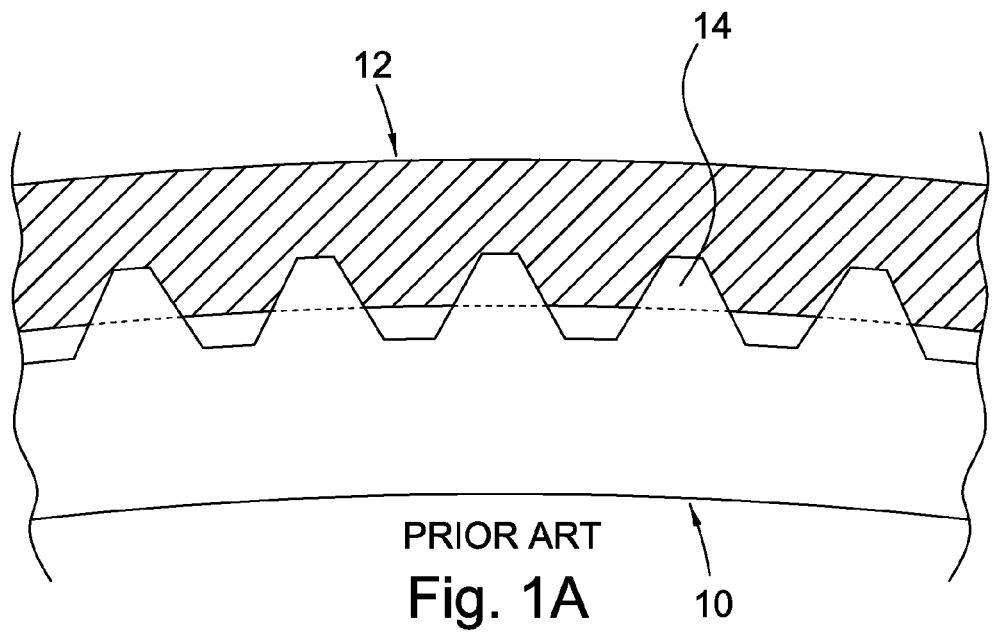
FIG. 1A is a detail from a prior art stator showing overlap of an outer race and a blade assembly prior to engagement of the outer race and the blade assembly.
Figure 1B:
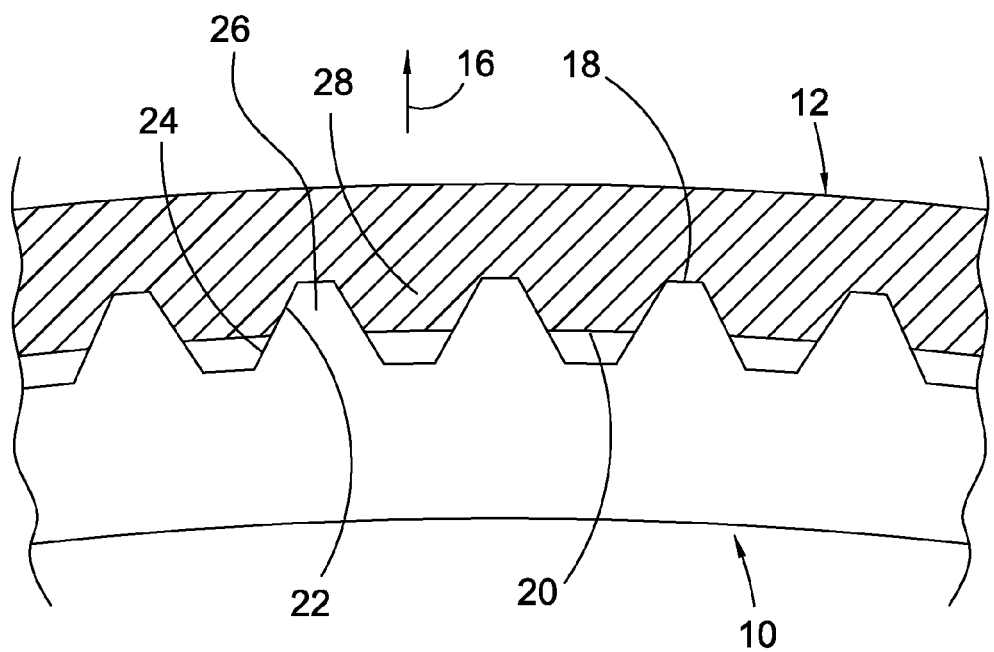
FIG. 1B is a detail from the prior art stator showing the engagement of the outer race and the blade assembly.
Figure 2A:
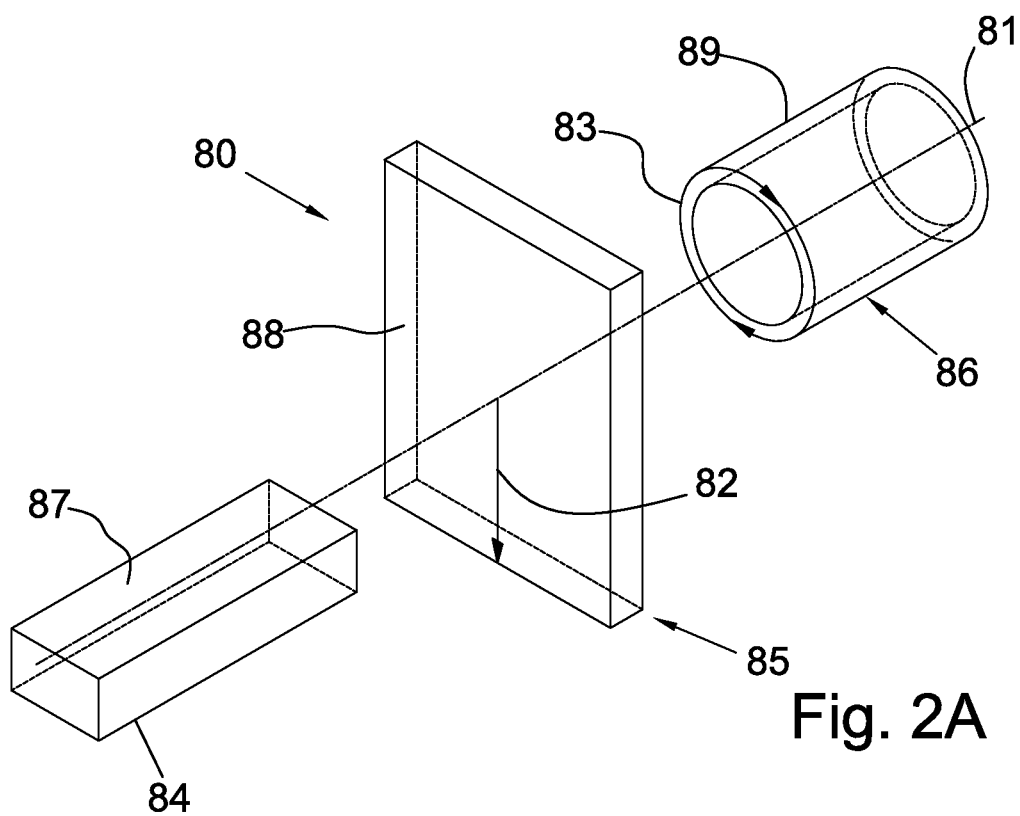
FIG. 2A is a perspective view of a cylindrical coordinate system demonstrating spatial terminology used in the present application.

FIG. 2A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 2B:
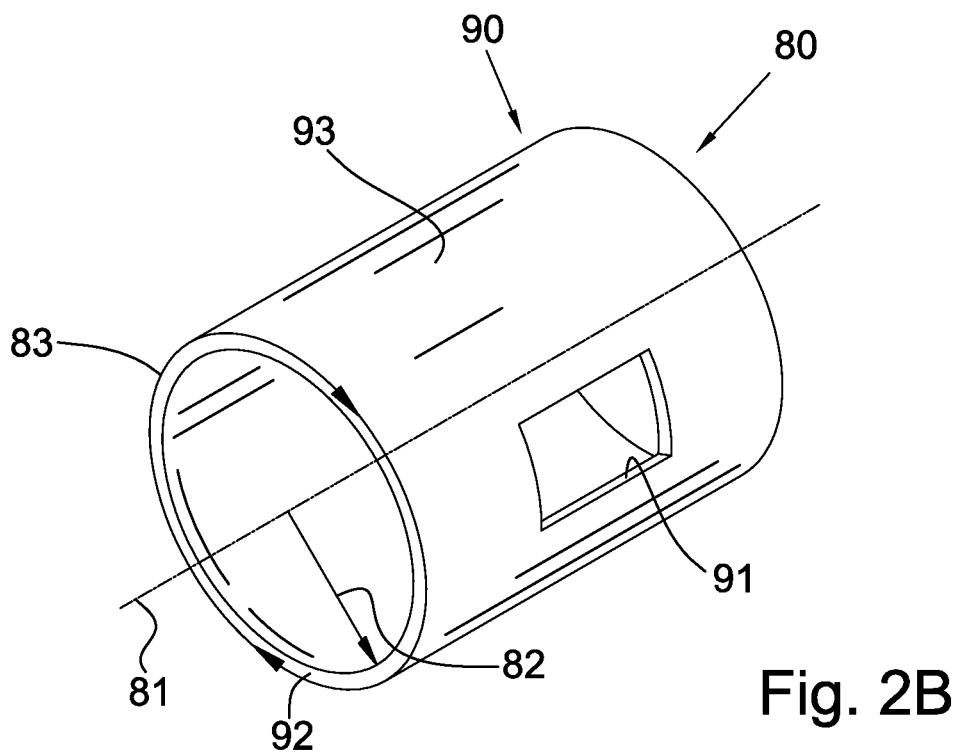
FIG. 2B is a perspective view of an object in the cylindrical coordinate system of FIG. 2A demonstrating spatial terminology used in the present application.

FIG. 2B is a perspective view of object 90 in cylindrical coordinate system 80 of FIG. 2A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

Figure 3:
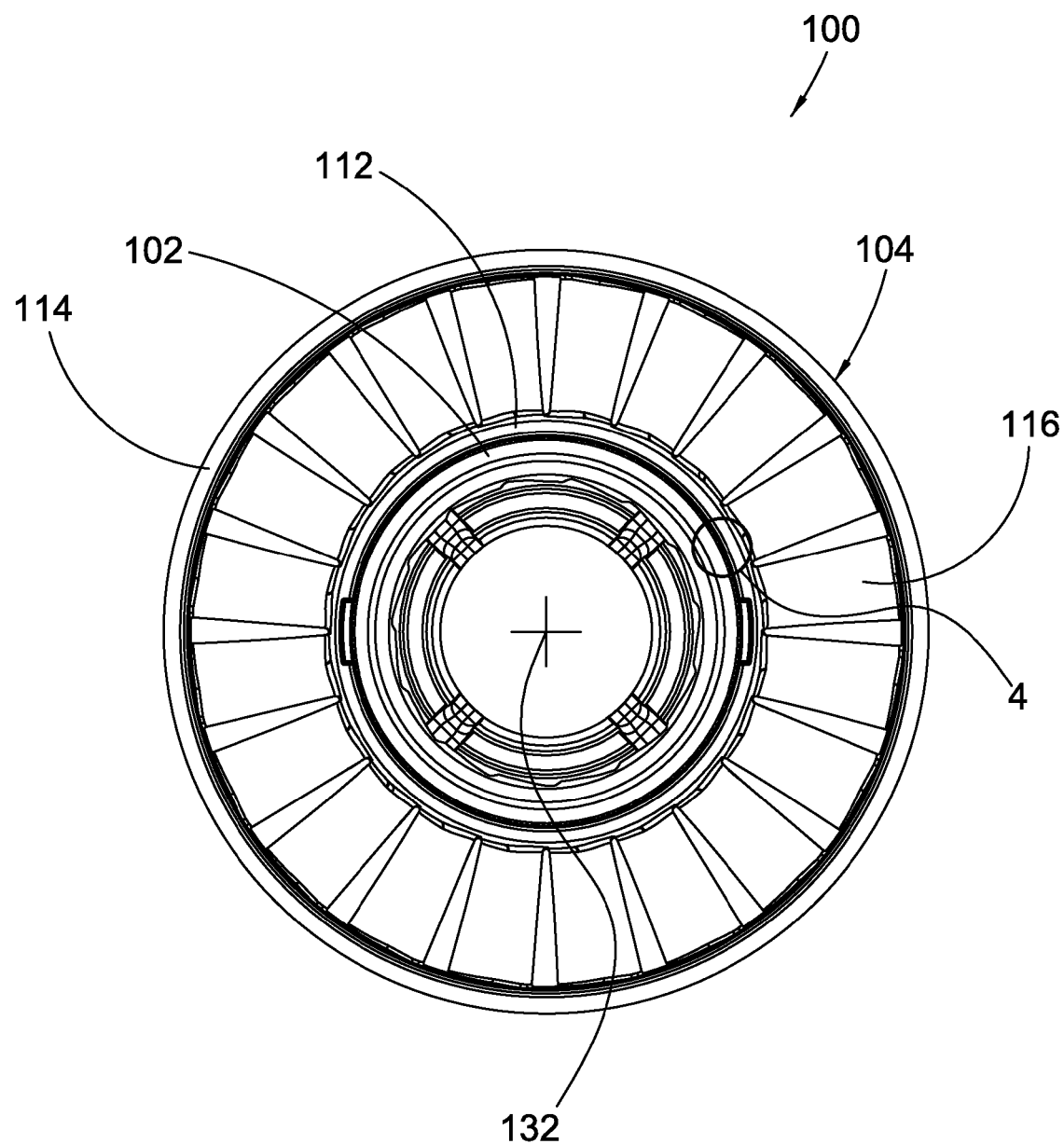
FIG. 3 is a front view of a present invention stator.

FIG. 3 is a front view of present invention stator 100.

Figure 4:
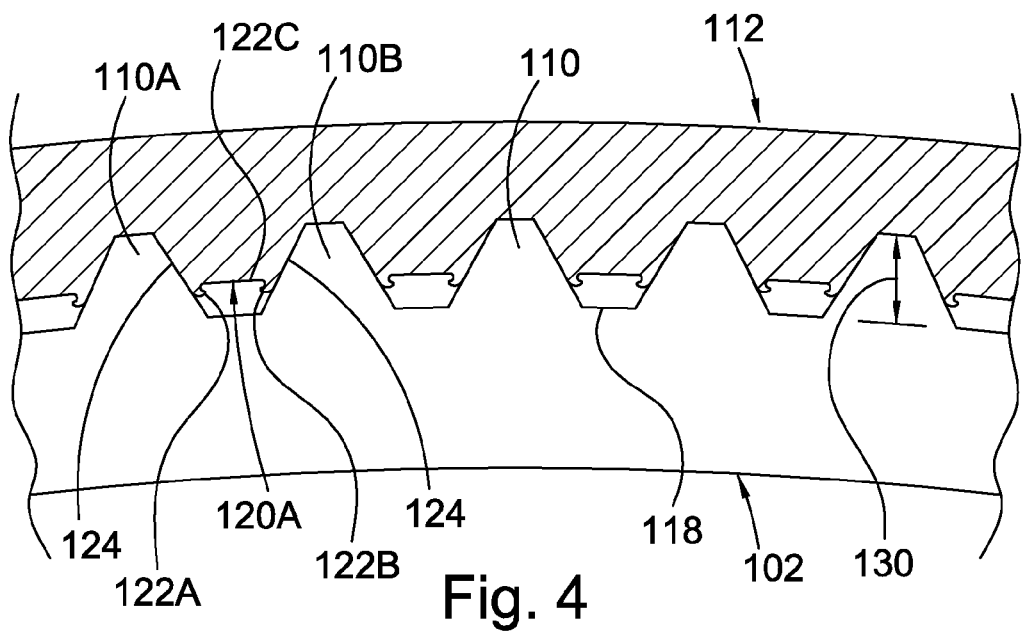
FIG. 4 is a detail of area 4 in FIG. 3 showing the displacement of material between grooves in the stator blade assembly after the engagement of the outer race and the stator blade assembly.

FIG. 4 is a detail of area 4 in FIG. 3 showing the displacement of material between grooves in the stator blade assembly after the engagement of the outer race and the stator blade assembly.

Figure 5:
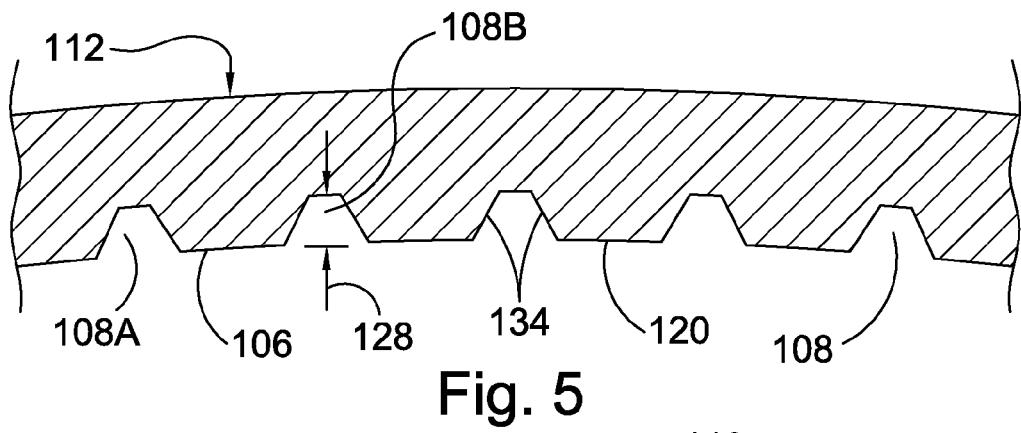
FIG. 5 is a detail showing a portion of the stator blade assembly prior to engagement of the outer race and the stator blade assembly; and, FIG. 6 is a detail showing the overlap of the outer race and the stator blade assembly prior to engagement of the outer race and the stator blade assembly.

FIG. 5 is a detail showing a portion of the stator blade assembly prior to engagement of the outer race and the stator blade assembly. The following should be viewed in light of FIGS. 3 through 5. Stator 100 includes outer race 102 and stator blade assembly 104. The blade assembly includes inner circumferential surface 106 and a plurality of pre-formed grooves 108 in the inner circumferential surface. As further described infra, the grooves are engageable with protrusions 110 on the outer race. By pre-formed, we mean that the grooves are formed as part of the fabrication of the assembly and are not formed by engagement of the blade assembly with other components of the stator. For example, the grooves are in place prior to the engagement of the grooves and the protrusions. It should be noted that the grooves can be modified by the engagement of the grooves and the protrusions as described infra. The grooves extend radially outward from surface 106. The stator blade assembly also includes inner circumferential portion 112, outer circumferential portion 114, and a plurality of blades 116 disposed between the inner and outer circumferential portions. The inner circumferential portion includes the inner circumferential surface. The outer race includes outer circumferential surface 118. The plurality of protrusions extends radially outward from surface 118.

The plurality of protrusions is frictionally engaged with the plurality of grooves. The inner circumferential surface includes a plurality of areas 120 circumferentially disposed between respective protrusions 110, for example, area 120A between protrusions 110A and 110B. In one embodiment, the engagement of the protrusions with the grooves results in some cutting of material in section 112 by the protrusions and some displacement of material in section 112 by the protrusions. In a first embodiment, area 120A is deformed by the engagement of the pluralities of grooves and protrusions, specifically by the engagement of protrusions 110A and 110B with grooves 108A and 108B, respectively. For example, area 120A is circumferentially compressed by sides 124 of the protrusions as protrusions 110A and 110B and grooves 108A and 108B are engaged. As a result, at least one of portions 122A and 122B of area 120A are displaced radially inward by the engagement of the pluralities of grooves and protrusions. Alternately stated, portions of area 120 adjacent to protrusions 110A and 110B, respectively, are disposed further radially inward than portion 122C, which is circumferentially centered between protrusions 110A and 110B. This "peening," or displacement, of areas 120 is a result of the desirably tight interference fit between the grooves and the protrusions. The peening also provides a means of absorbing or redirecting forces associated with the engagement of the grooves and protrusions. Advantageously, this redirecting eliminates or greatly reduces hoop stresses on the blade assembly and reduces or eliminates radial expansion of section 112 as further described infra.

Figure 6:
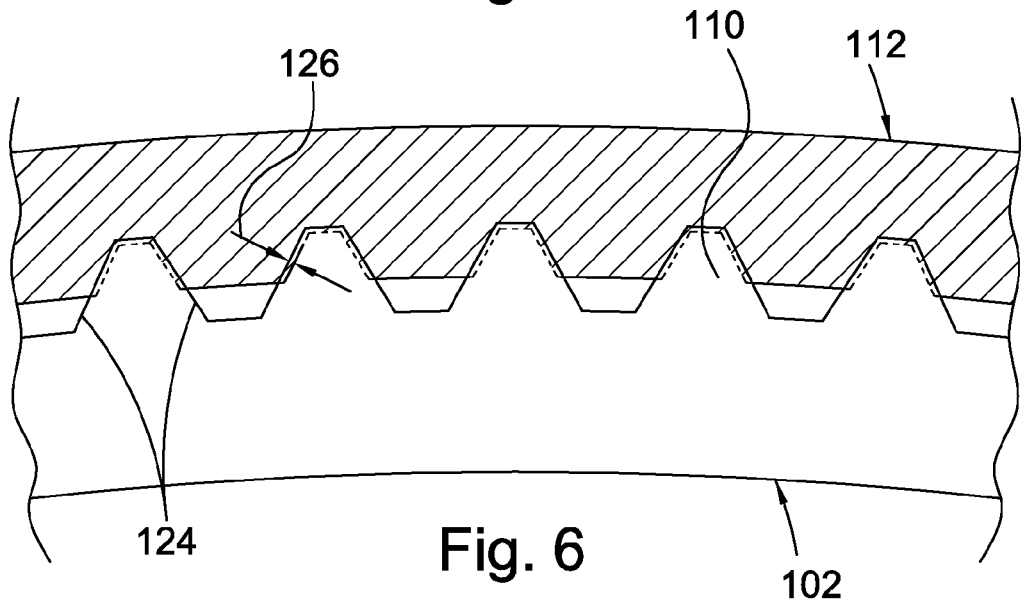

FIG. 6 is a detail showing the overlap of the outer race and the stator blade assembly prior to engagement of the outer race and the stator blade assembly. The following should be viewed in light of FIGS. 3 through 6. In FIG. 6, the outer race and the blade assembly are axially stacked (placed one upon the other) and it is seen that sides 124 of the grooves circumferentially overlap the protrusions prior to the engagement of the protrusions and grooves. The amount of overlap 126 can be determined by the dimensions, desired torque capacity, material characteristics, and other parameters associated with a particular application. However, in general overlap 126 is selected to provide a desired interference, or friction, fit. In one embodiment, as the grooves and protrusions are engaged (the outer race and the blade assembly are axially pushed together), the material forming overlap 126 is "squeezed" or displaced radially inward by contact with the protrusions to form portions 122A and 122B. Thus, the protrusions cause a displacement of material in portion 112, minimizing or eliminating hoop stress associated with the engagement of the grooves and protrusions and minimizing or eliminating the outward radial force on portion 112.

In a second embodiment, inner circumferential portion 112 is made of a first material having a first thermal expansion coefficient and the outer race is made of a second material having a second thermal expansion coefficient less than the first thermal expansion coefficient. In a third embodiment, the blade assembly is made of cast aluminum and the outer race is made of steel. Aluminum has a thermal expansion coefficient of $2.1 \times 10^{-5}$ 1/K. Steel has a thermal expansion coefficient of $1.1 \times 10^{-5}$ 1/K. As noted supra, a large difference in respective thermal expansion coefficients for an outer race and a blade assembly can result in a reduction of torque capacity for the blade assembly. However, advantageously, the interface of the protrusions and grooves in stator 100 enables the protrusions and grooves to remain intermeshed during the unequal expansion of the outer race and portion 112 as described infra, greatly increasing the torque capacity of the stator, in particular under high temperature conditions.

Stator 100 has an increased torque capacity since depth 128 of the grooves is radially greater than a depth possible for the protrusions described supra. For example, the radial overlap of the protrusions with portion 112 is increased. Subsequently, radial extent 130 of the teeth can be made greater while holding the same overall radial dimensions for stator 100. For example, in one embodiment, a radial distance from axis of rotation 132 of the stator to surface 120 is substantially unchanged before and after engagement of the outer race and the blade assembly. In a fourth embodiment, there is no change in the radial distance before and after engagement of the outer race and the blade assembly. Returning to the embodiment in which the inner circumferential portion 112 is made of a first material having a first thermal expansion coefficient and the outer race is made of a second material having a second thermal expansion coefficient less than the first thermal expansion coefficient, for example, the blade assembly is made of cast aluminum and the outer race is made of steel, under high temperature conditions, inner portion 112 expands and the radial distance from the axis to surface 120 begins to increase. At the same time, surface 118 begins to expand, but at a lesser rate than portion 112. Thus, the blade assembly begins to "pull away from" the outer race. That is, surface 120 is expanding radially outward more quickly than surface 118. However, due to the increased depth of the grooves and radial extent of the protrusions, contact is maintained between sides 124 and sides 134 of the grooves as the unequal expansion occurs, which results in a larger torque capacity for the stator under high temperature operating conditions for the stator.

In a fifth embodiment, the blade assembly is made of cast aluminum. It should be understood that a present invention stator blade assembly and a present invention stator are not limited to the configurations shown and that other configurations are within the spirit and scope of the claimed invention. Specifically, it should be understood that a present invention stator blade assembly is not limited to the symmetry, configuration, number, shape, spacing, or relative size of grooves shown and that other symmetries, configurations, numbers, shapes, spacings, or relative sizes of grooves are within the spirit and scope of the claimed invention. Further, it should be understood that an outer race for a present invention stator is not limited to the symmetry, configuration, number, shape, spacing, or relative size of protrusions shown and that other symmetries, configurations, numbers, shapes, spacings, or relative sizes of protrusions are within the spirit and scope of the claimed invention.

The present invention also includes a method for joining an outer race and a blade assembly for a stator. Although the method is depicted as a sequence for clarity, no order should be inferred from the sequence unless explicitly stated. A first step forms a plurality of radially outwardly extending grooves in an inner circumferential surface of the blade assembly. A second step stacks the outer race on the blade assembly so that the plurality of grooves axially aligns with a plurality of protrusions on an outer circumferential surface of the outer race. A third step axially displaces the outer race or the blade assembly toward one another so that the outer race and the blade assembly axially align and the pluralities of grooves and protrusions engage.

In a sixth embodiment, the inner circumferential surface includes an area circumferentially disposed between first and second protrusions from the plurality of protrusions and axially displacing the outer race or the blade assembly includes deforming the area. In a seventh embodiment, the inner circumferential surface includes an area circumferentially disposed between first and second protrusions from the plurality of protrusions and axially displacing the outer race or the blade assembly includes displacing radially inward a portion of the area.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A stator, comprising:
    a blade assembly with an inner circumferential surface and a plurality of pre-formed grooves in the inner circumferential surface; and,
    an outer race with an outer circumferential surface and a plurality of protrusions at least partially engaged with the plurality of pre-formed grooves, wherein the inner circumferential surface includes an area circumferentially disposed between first and second protrusions from the plurality of protrusions and wherein a portion of the area is displaced radially inward by the engagement of the pluralities of grooves and protrusions.

2. The stator of claim 1 wherein the plurality of protrusions is frictionally engaged with the plurality of pre-formed grooves.

3. The stator of claim 1 wherein the inner circumferential surface includes an area circumferentially disposed between first and second protrusions from the plurality of protrusions and wherein a portion of the area adjacent to the first protrusion is disposed further radially inward than a portion of the area circumferentially centered between the first and second protrusions.

4. The stator of claim 1 wherein the inner circumferential surface includes an area circumferentially disposed between first and second protrusions from the plurality of protrusions and deformed by the engagement of the pluralities of grooves and protrusions.

5. The stator of claim 1 wherein the blade assembly includes an inner circumferential portion and outer circumferential portion and a plurality of blades disposed between the inner and outer circumferential portions, wherein the inner circumferential portion includes the inner circumferential surface, wherein the inner circumferential portion is made of aluminum, and wherein the outer race is made of steel.

6. The stator of claim 1 wherein the blade assembly includes an inner circumferential portion and outer circumferential portion and a plurality of blades disposed between the inner and outer circumferential portions, wherein the inner circumferential portion includes the inner circumferential surface, wherein the inner circumferential portion is made of a first material having a first thermal expansion coefficient, and wherein the outer race is made of a second material having a second thermal expansion coefficient less than the first thermal expansion coefficient.

7. The stator of claim 1 further comprising an axis of rotation, wherein the inner circumferential surface is at a first radial distance from the axis before the pluralities of grooves and protrusions are engaged, and wherein the inner circumferential surface is at a second radial distance from the axis, substantially equal to the first radial distance, after the pluralities of grooves and protrusions are engaged.

8. A method for joining an outer race and a blade assembly for a stator, comprising the steps of:

forming a plurality of radially outwardly extending grooves in an inner circumferential surface of the blade assembly;

stacking the outer race on the blade assembly so that the plurality of grooves axially align with a plurality of protrusions on an outer circumferential surface of the outer race; and, axially displacing the outer race or the blade assembly toward one another so that the outer race and the blade assembly axially align and the pluralities of grooves and protrusions engage, wherein the inner circumferential surface includes an area circumferentially disposed between first and second protrusions from the plurality of protrusions and wherein axially displacing the outer race or the blade assembly includes displacing radially inward a portion of the area.

9. The method of claim 8 wherein the inner circumferential surface includes an area circumferentially disposed between first and second protrusions from the plurality of protrusions and wherein axially displacing the outer race or the blade assembly includes deforming the area.

10. A stator, comprising:

a blade assembly with an inner circumferential surface and a plurality of pre-formed grooves in the inner circumferential surface; and, an outer race with an outer circumferential surface and a plurality of protrusions at least partially engaged with the plurality of pre-formed grooves wherein the inner circumferential surface includes an area circumferentially disposed between first and second protrusions from the plurality of protrusions and wherein a portion of the area adjacent to the first protrusion is disposed further radially inward than a portion of the area circumferentially centered between the first and second protrusions.

* * * * *